US012526538B2

United States Patent
Ke et al.

(10) Patent No.: US 12,526,538 B2
(45) Date of Patent: Jan. 13, 2026

(54) FRAME IMAGE CONVERSION SPIKE SYSTEM

(71) Applicants: ShenZhen SynSense Technology Co., Ltd., Shenzhen (CN); Shanghai SynSense Technology Co., Ltd., Shanghai (CN)

(72) Inventors: LingYun Ke, Shanghai (CN); Yannan Xing, Shenzhen (CN); Xin Bai, Shanghai (CN); Ning Qiao, Shenzhen (CN)

(73) Assignees: ShenZhen SynSense Technology Co., Ltd., Shenzhen (CN); Shanghai SynSense Technology Co., Ltd., Shanghai (CN)

( * ) Notice: Subject to any disclaimer, the term of this patent is extended or adjusted under 35 U.S.C. 154(b) by 299 days.

(21) Appl. No.: 18/270,057

(22) PCT Filed: Jun. 7, 2022

(86) PCT No.: PCT/CN2022/097292
§ 371 (c)(1),
(2) Date: Jun. 28, 2023

(87) PCT Pub. No.: WO2023/197429
PCT Pub. Date: Oct. 19, 2023

(65) Prior Publication Data
US 2023/0421917 A1    Dec. 28, 2023

(30) Foreign Application Priority Data

Apr. 13, 2022 (CN) .......................... 202210381831.2
Apr. 14, 2022 (CN) .......................... 202210387836.6

(51) Int. Cl.
*H04N 23/951* (2023.01)
*H04N 25/47* (2023.01)

(52) U.S. Cl.
CPC .......... *H04N 23/951* (2023.01); *H04N 25/47* (2023.01)

(58) Field of Classification Search
CPC ........ G06N 3/049; G06N 3/0635; G06N 3/08; G06N 3/04; G06N 3/065; H04N 23/951; H04N 25/47; H04N 7/01
(Continued)

(56) References Cited

U.S. PATENT DOCUMENTS 11,164,019 B1    11/2021    Ryan et al.
11,282,221 B1    3/2022     Yang
(Continued)

FOREIGN PATENT DOCUMENTS

CN    102088597 A    6/2011
CN    104270561 A    1/2015
(Continued)

OTHER PUBLICATIONS

PCT International Search Report for International Application No. PCT/CN2022/097292, mailed on Nov. 29, 2022, 5pp.
(Continued)

*Primary Examiner* — Lin Ye
*Assistant Examiner* — Chan T Nguyen
(74) *Attorney, Agent, or Firm* — Michael D. Eisenberg; MDE Patents

(57) ABSTRACT

A frame image conversion spike system is disclosed. In order to solve the technical problem of high power consumption when converting a frame image into a spike event, a frame rate or difference frame frequency is adaptively adjusted according to the amount of effective pixel change between frame images, so as to reduce system power consumption and adaptively respond to scene application needs. In order to solve the issue of low inference accuracy after converting frame images into spike events and directly
(Continued)

applying them to an SNN processor, a global randomization scheme is proposed considering the randomization process of images as a whole. It has opened up all the links of applying a frame image sensor to the SNN processor and provided an alternative to an event camera. This is suitable for a brain-inspired chip and AIoT field.

11 Claims, 10 Drawing Sheets

(58) Field of Classification Search
USPC .................................................... 348/222.1
See application file for complete search history.

(56) References Cited

U.S. PATENT DOCUMENTS

| | | | |
|---|---|---|---|
| 2017/0296081 | A1 | 10/2017 | Liao et al. |
| 2018/0366048 | A1 | 12/2018 | Kuo et al. |
| 2020/0074272 | A1* | 3/2020 | Okazawa ............... G06N 3/065 |
| 2020/0218959 | A1* | 7/2020 | Srinivasa ............... G06N 3/08 |
| 2021/0365778 | A1 | 11/2021 | Dey et al. |
| 2022/0141463 | A1 | 5/2022 | Huang |
| 2022/0191393 | A1 | 6/2022 | Sironi et al. |
| 2022/0254135 | A1 | 8/2022 | Pires Dos Reis Moreira et al. |
| 2022/0301594 | A1 | 9/2022 | Bose et al. |
| 2023/0104942 | A1* | 4/2023 | Wu ........................ G06N 3/063 706/27 |

FOREIGN PATENT DOCUMENTS

| | | |
|---|---|---|
| CN | 104980621 A | 10/2015 |
| CN | 106303157 A | 1/2017 |
| CN | 107072569 A | 8/2017 |
| CN | 107211109 A | 9/2017 |
| CN | 108805879 A | 11/2018 |
| CN | 108985252 A | 12/2018 |
| CN | 109215550 A | 1/2019 |
| CN | 109379590 A | 2/2019 |
| CN | 109803096 A | 5/2019 |
| CN | 110458903 A | 11/2019 |
| CN | 111046954 A | 4/2020 |
| CN | 111310816 A | 6/2020 |
| CN | 111860786 A | 10/2020 |
| CN | 111898737 A | 11/2020 |
| CN | 112446851 A | 3/2021 |
| CN | 112464807 A | 3/2021 |
| CN | 113132658 A | 7/2021 |
| CN | 113744355 A | 12/2021 |
| CN | 113873183 A | 12/2021 |
| CN | 114155478 A | 3/2022 |
| CN | 114466153 A | 5/2022 |
| CN | 114495178 A | 5/2022 |
| EP | 3518529 A1 | 7/2019 |
| EP | 3789909 A1 | 3/2021 |
| WO | 2021044021 A1 | 3/2021 |

OTHER PUBLICATIONS

Chinese Office Action issued in corresponding Chinese Patent Application No. 202210381831.2 dated May 18, 2022, pp. 1-10.
Chinese Notice of Allowance issued in corresponding Chinese Patent Application No. 202210381831.2 dated Aug. 11, 2022, pp. 1-5.
Chinese Notice of Allowance issued in corresponding Chinese Patent Application No. 202210387836.6 dated May 25, 2022, pp. 1-5.
Lan Haoxin, Chen Yunhua. SNN Training Algorithm Based on Relationship Between Pulse Frequency and Input Current[J]. Computer Engineering and Applications, Aug. 6, 2021.
Yang Jing, Xu Yan, Zhao Xin. Research on Spiking neuron sensitivity to input perturbation. Computer Engineering and Applications, Jan. 15, 2017.
Lu Xingpeng, et al. An Event Coding Method Based on Frame Images With Dynamic Vision Sensor Modeling. 2019 EEE International Conference on Signal, Information and Data Processing (ICSIDP), Aug. 21, 2020.

* cited by examiner

FRAME IMAGE CONVERSION SPIKE SYSTEM

CROSS-REFERENCE TO RELATED APPLICATIONS

This application is a US national phase application based upon an International Application No. PCT/CN2022/097292, filed on Jun. 7, 2022, which claims priority to Chinese Patent Application No. 202210381831.2, filed with the Chinese Patent Office on Apr. 13, 2022, and entitled "ADAPTIVE SPIKE GENERATION METHOD, DEVICE, BRAIN-INSPIRED CHIP, AND ELECTRONIC DEVICE". This application claims priority to Chinese Patent Application No. 202210387836.6, filed with the Chinese Patent Office on Apr. 14, 2022, and entitled "SPIKE TRAIN RANDOMIZATION METHOD, DEVICE, BRAIN-INSPIRED CHIP, AND ELECTRONIC DEVICE". The entire disclosures of the above application are incorporated herein by reference.

TECHNICAL FIELD

The present invention relates to a method for converting frame images into spike events, a device, a brain-inspired chip, and an electronic device, and particularly to an adaptive spike generation and randomization method, a device, a brain-inspired chip, and an electronic device.

BACKGROUND

Spiking neural network (SNN), because of its rich neural dynamics and communication methods of spike events, has achieved excellent performance in efficiently processing complex, sparse, and noisy spatio-temporal information, and is currently the neural network closest to the working mode of the human brain. Because of the prospect of ultra-low power consumption and advanced intelligence, it has become a new research hotspot in the field of artificial intelligence.

Dynamic vision sensor (DVS) is a new type of sensor deployed with an array of independent photosensitive pixels. After the pixel senses the change in light intensity, it independently and asynchronously sends spike events to the next-level system (such as a brain-inspired chip). Because of its ultra-high time resolution, it has attracted much attention. However, there is still a certain gap between its signal-to-noise ratio, dark-light sensing capability, consistency, measurability, and actual application requirements.

Conventional frame-based image sensors (such as CMOS sensors, CCD sensors, etc., referred to as frame image sensors) are relatively mature image capture devices with high signal-to-noise ratios, but they cannot generate spike events (referred to as spikes or events, several spikes constitute a spike train), and multiple images can only be continuously generated in units of frames.

It is an alternative to the DVS sensor to generate a spike train (ideally, a random spike train that satisfies the Poisson distribution) that satisfies the needs of a spiking neural network processor (also known as a brain-inspired chip or neuromorphic chip) through a frame image sensor. Even more advantageously, this alternative can be directly integrated in electronic devices with frame image sensors, using existing devices directly.

Therefore, a spike generation technology with high signal-to-noise ratio, low power consumption, low cost, and easy implementation is required to satisfy the application requirements of SNN processors. For the existing technology of converting the image collected by the frame image sensor into a spike event, for details, please refer to:
Prior art 1: CN111898737A.
Prior art 2: CN111860786A.
Prior art 3: EP3789909A1.
Prior art 4: CN112464807A.

Prior arts 1 and 2 provide solutions for converting numerical values/images into spike trains. Its core is to exchange or change a certain number of spikes to obtain a target spike train after generating an initial spike train for a specific pixel value. However, its disadvantage is that the number of spikes that are randomly exchanged or changed is limited, and it is difficult to guarantee the effect of randomization. Especially when the time step is long, and the cost of hardware implementation is relatively high. In addition, it does not mention the difference frame method to obtain the contour information, but only performs random spike train conversion for each pixel value of the ordinary frame image. However, the recognition accuracy of the spike train obtained in this way is extremely low in the spiking neural network.

Prior arts 3 and 4 provide region-of-interest extraction schemes based on difference frames and compare the difference between two frames of different images to generate a spike event train. However, it has issues of high-power consumption and insufficient real-time performance, and it cannot rule out significant noise causing poor network performance. Furthermore, they do not give schemes for the randomization of the spike train, which very negatively affects the inference accuracy of the SNN processor.

SUMMARY OF INVENTION

Technical Problem

The present invention proposes an adaptive spike generation and randomization method, a device, a brain-inspired chip, and an electronic equipment.

Problem Solution

Technical Solution

In order to solve or alleviate some or all of the above-mentioned technical problems, the present invention is achieved through the following technical solutions:

An adaptive spike generation method comprising following steps: comparing a difference between frame images to obtain a difference frame pixel value at each pixel coordinate in a difference frame; obtaining a number of spike events corresponding to the pixel coordinate based on the difference frame pixel value; and at least based on an overall difference frame pixel value of all pixels in the difference frame and/or a corresponding overall number of the spike events of all pixels in the difference frame, judging whether to adjust a frame generating rate or a difference frame frequency of the frame images.

In an embodiment, in the difference frame, when a sum of pixel values, a sum of pixel values that satisfies a preset condition, or a count value of a number of pixels whose pixel value satisfies the preset condition: if it is less than a first threshold, the frame rate or the difference frame frequency is reduced, and/or greater than a second threshold, the frame rate or the difference frame frequency is increased; or in the difference frame, when a sum of the number of spike events corresponding to the difference frame, a sum of the number of spike events that satisfies the preset condition, or a count value of the number of pixels whose number of spike events satisfies the preset condition: if it is less than a first threshold, the frame rate or the difference frame frequency is reduced, and/or greater than the second threshold, the frame rate or the difference frame frequency is increased.

In an embodiment, in the difference frame, when a count value of a number of pixels whose pixel values satisfies the preset condition: if it is less than a first ratio, the frame rate or the difference frame frequency is reduced, and/or greater than a second ratio, the frame rate or the difference frame frequency is increased; the first ratio is a proportion of the count value of the number of pixels in the difference frame whose pixel value satisfies the preset condition in the pixels of the whole difference frame; or in the difference frame, when a count value of the number of pixels whose number of spike events satisfies the preset condition: if it is less than the first ratio, the frame rate or the difference frame frequency is reduced, and/or greater than the second ratio, the frame rate or the difference frame frequency is increased; the second ratio is a proportion of the count value of the number of pixels in the difference frame whose number of spike events satisfies the preset condition in the pixels of the whole difference frame.

In an embodiment, after reducing the frame rate or the difference frame frequency for a first time interval, restore the frame rate or the difference frame frequency to a default value; and/or, when within a second time interval, a sum of pixel values of difference frames or a sum of a number of spike events is less than a first threshold, the frame rate or the difference frame frequency is reduced.

In an embodiment, the adaptive spike generation method further comprises: generating a randomized target spike train based on the number of spike events; judging whether a sum of pixel values of difference frames, a sum of pixel values whose pixel values satisfies a preset condition, or a count value of a number of pixels in the difference frame whose pixel value satisfies the preset condition is greater than a third threshold, and if yes, the step of obtaining the number of spike events corresponding to the pixel coordinate based on the difference frame pixel value is no longer performed; or in the difference frame, judging whether a sum of the number of spike events corresponding to the difference frame, a sum of the number of spike events that satisfies the preset condition, or a count value of the number of pixels whose number of spike events satisfies the preset condition: if it is greater than the third threshold, and if yes, a step of generating the randomized target spike train based on the number of spike events is no longer performed.

An adaptive spike generation device configured to generate a target spike train, comprising: a difference frame module configured to compare a difference between frame images to obtain a difference frame pixel value at each pixel coordinate in a difference frame; a spike event quantity generation module configured to generate a number of spike events corresponding to the pixel coordinate based on the difference frame pixel value; a randomization module configured to generating a randomized target spike train based on the number of spike events; and a first judging module configured to judge whether to adjust a frame generating rate or a difference frame frequency of the frame images at least based on an overall difference frame pixel value of all pixels in the difference frame and/or a corresponding overall number of the spike events of all pixels in the difference frame.

In an embodiment, in the difference frame, when a sum of pixel values, a sum of pixel values that satisfies a preset condition, or a count value of a number of pixels whose pixel value satisfies the preset condition: if it is less than a first threshold, the frame rate or the difference frame frequency is reduced, and/or greater than a second threshold, the frame rate or the difference frame frequency is increased; or in the difference frame, when a sum of the number of spike events corresponding to the difference frame, a sum of the number of spike events that satisfies the preset condition, or a count value of the number of pixels whose number of spike events satisfies the preset condition: if it is less than a first threshold, the frame rate or the difference frame frequency is reduced, and/or greater than the second threshold, the frame rate or the difference frame frequency is increased.

In an embodiment, the adaptive spike generation device further comprises: a second judge module configured to whether the sum of the pixel values of the difference frames and/or the sum of the number of spike events is greater than a third threshold, and if yes, terminating a randomization operation on the spike events.

A spike train randomization method, comprising following steps: obtaining a difference frame pixel value between frame images; calculating a number of spike events corresponding to the difference frame pixel value according to the difference frame pixel value; wherein the spike train randomization method further comprises at least one of the following steps:

i) storing a pixel coordinate corresponding to the difference frame pixel value in the same number of storage units as the number of spike events; reading the pixel coordinate stored in the storage unit corresponding to a random number according to a currently obtained random number; generating spike events in a target spike train at least according to a read pixel coordinate information;

ii) storing the number of spike events in the storage unit corresponding to the pixel coordinate of the difference frame pixel value; reading the number of spike events stored in the storage unit corresponding to the random number according to the currently obtained random number; if a read number of spike events is non-zero, generating spike events in the target spike train at least according to a pixel coordinate information of the difference frame pixel value corresponding to the storage unit.

In an embodiment, the difference frame pixel value is a difference between pixel values between two adjacent frames of images, or an absolute value of the difference between the pixel values between two adjacent frames of images.

In an embodiment, calculating the number of spike events corresponding to the difference frame pixel value is obtained according to one of the following methods:

i) a ratio of a product of the difference frame pixel value and a maximum number of spike events allowed to be issued by a single pixel to a theoretical maximum value of the pixel in the difference frame;

ii) a ratio of the product of the difference frame pixel value and the maximum number of spike events allowed to be issued by a single pixel to a maximum pixel value in the difference frame;

iii) a ratio of the product of the difference frame pixel value and the maximum number of spike events allowed to be issued by a single pixel to a larger one of the maximum pixel value in the difference frame or a first lower limit value.

In an embodiment, after obtaining the difference frame pixel value between the frame images, if the difference frame pixel value is smaller than a second lower limit value, the difference frame pixel value is set to zero.

In an embodiment, a random number sequence is generated by a random number generation module, and a currently obtained random number comes from the random number sequence; the random number sequence does not generate the same random number within a cycle; the random number generation module comprises at least one random number generator based on a linear feedback shift register; or a period of the random number sequence is equal to a product of a number of pixels in the difference frame and a maximum number of spike events allowed to be issued by a single pixel, or equal to the number of pixels in the difference frame.

In an embodiment, according to the currently obtained random number, when reading the number of spike events stored in the storage unit corresponding to the random number, the random number comes from a random number sequence, and a period of the random number sequence is equal to the number of pixels in the difference frame; for each difference frame, the random number sequence is executed for a number of cycles equal to a maximum number of spike events allowed to be issued by a single pixel.

A spike train randomization method, comprising following steps: obtaining a channel output signal; according to the channel output signal, obtaining a number of spike events corresponding to the channel output signal; wherein the spike train randomization method further comprises at least one of the following steps:
  i) storing a channel address corresponding to the channel output signal in storage units having the same number as the number of spike events; reading the channel address stored in the storage unit corresponding to a random number according to a currently obtained random number; generating spike events in a target spike train based at least on a read channel address information;
  ii) storing the number of spike events in the storage unit corresponding to the channel address of the channel output signal; reading the number of spike events stored in the storage unit corresponding to the random number according to the currently obtained random number; if a read number of spike events is not zero, at least according to a channel address information of the channel output signal corresponding to the storage unit, generating the spike events in the target spike train.

A spike train randomization device, comprising: a difference frame storage space and a spike event address storage space or a spike event quantity storage space; or a frame image storage space and a spike event quantity storage space; and the spike train randomization device configured to perform any one of the above spike train randomization methods;
  wherein the difference frame storage space is used to store a difference frame pixel value; a storage unit included in the spike event address storage space is used to store a pixel coordinate corresponding to the difference frame pixel value; the storage unit included in the spike event quantity storage space is used to store a number of spike events corresponding to the difference frame pixel value; a storage unit included in the frame image storage space is used to store a latest pixel value obtained from a frame image sensor.

A brain-inspired chip, comprising: wherein the brain-inspired chip uses any one of the above adaptive spike generation methods; the brain-inspired chip includes any one of the above the adaptive spike generation devices; the brain-inspired chip applies any one of the above the spike train randomization methods; or the brain-inspired chip comprises any one of the above the spike train randomization devices.

An electronic device, comprising: wherein electronic device includes any one of the above the adaptive spike generation devices; the electronic device comprises any one of the above the spike train randomization devices; or the electronic device comprises any one of the above the brain-inspired chips.

BENEFICIAL EFFECT OF INVENTION

Beneficial Effect

Part or all of the embodiments of the present invention have the following beneficial technical effects:
1) In the process of generating the target spike train, the present invention can adaptively adjust the frame rate or difference frame frequency, and the flexibility is high. It can not only ensure low power consumption in an environment that has not changed for a long time, but also quickly capture motion changes when needed.
2) The present invention can terminate unreasonable processes in time (total difference frame pixel value or total spike event number is too large), effectively eliminate noise and save power consumption. The present invention ensures real-time, high-efficiency, and stable operation of the SNN processor by controlling the number of spikes in the target spike train.
3) The hardware of the present invention is friendly and low in cost. Compared with DVS, the existing camera in the electronic device can be directly used without installing a new set of imaging modules and sensors.
4) Multiple steps of the present invention can be processed in parallel, saving resources and further reducing power consumption.
5) Take the image as a whole and macroscopically consider that the image is randomized into the target spike train. For spiking neural networks, it is a friendly randomization method. There is no defect of significantly reducing the performance of the spiking neural network due to splicing trains corresponding to splicing pixels one by one. Therefore, its randomization effect is good.
6) The consumption of hardware resources is low, and the energy consumed by conversion is low.
7) Contour enhancement can improve network performance in low light and weak jitter conditions.
8) Suppress background noise and reduce power consumption under long-term standby.

More beneficial effects will be further introduced in the preferred embodiments.

The technical solutions/features disclosed above are intended to summarize the technical solutions and technical features described in the detailed description, such that the scope of the description may not be completely the same. However, these new technical solutions disclosed in this part also belong to a part of many technical solutions disclosed in the present invention. The technical features disclosed in this part, the technical features disclosed in the subsequent detailed description, and some content in the drawings that are not explicitly described in the specification disclose more technical solutions in a reasonable combination with each other.

The technical solution composed of all the technical features disclosed in any position of the present invention is used to support the summary of the technical solution, the modification of the patent document, and the disclosure of the technical solution.

BRIEF DESCRIPTION OF THE DRAWINGS

Description of the Drawings

Figure 1:
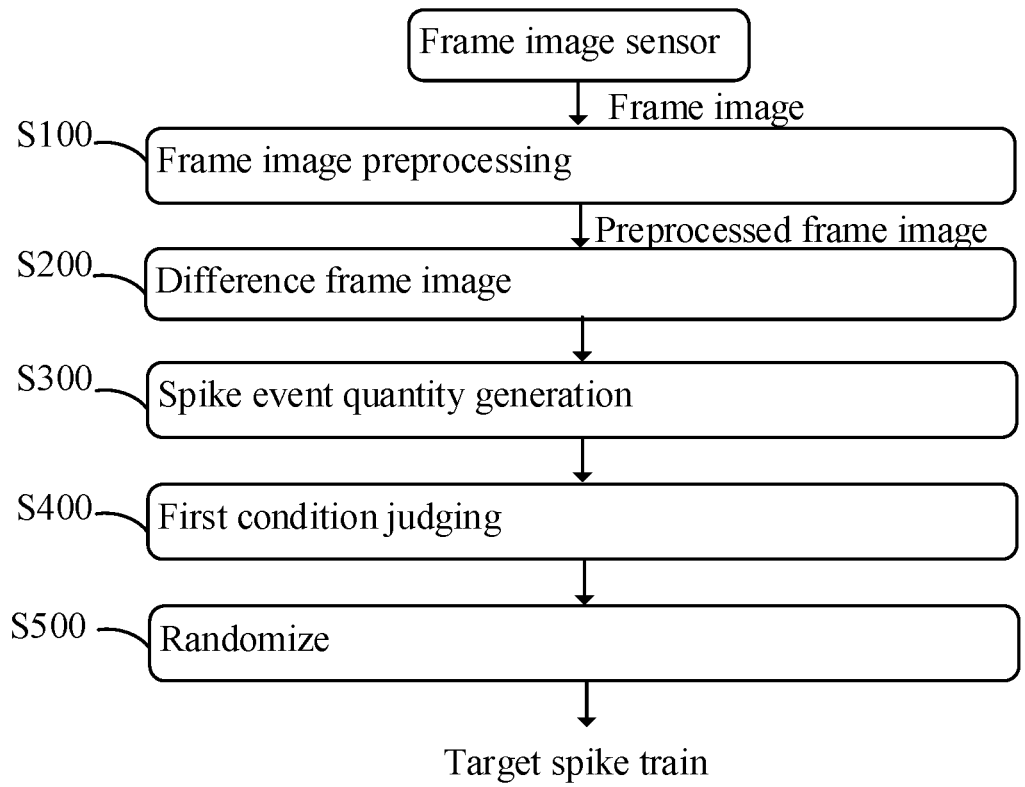

FIG. 1 is a flowchart of an adaptive spike generation method in a preferred embodiment of the present invention.

Figure 2:
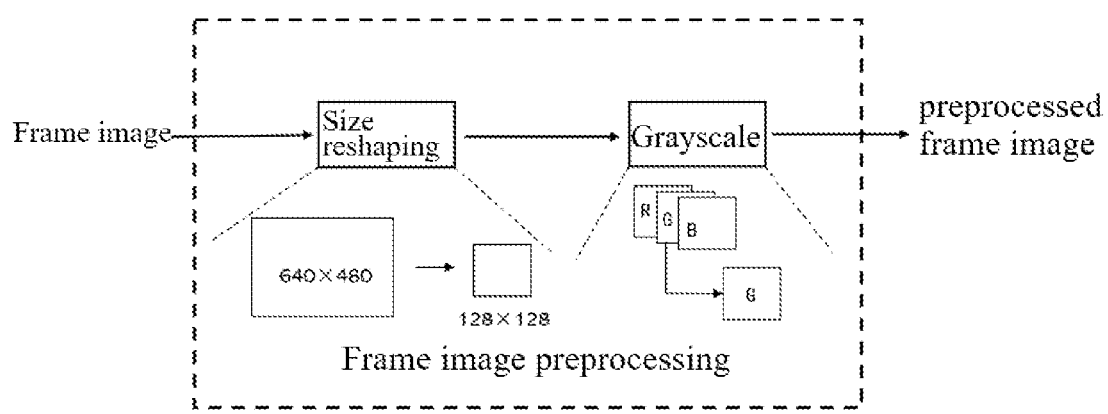

FIG. 2 is a schematic diagram of preprocessing operations including size reshaping and grayscale operations in an embodiment.

Figure 3:
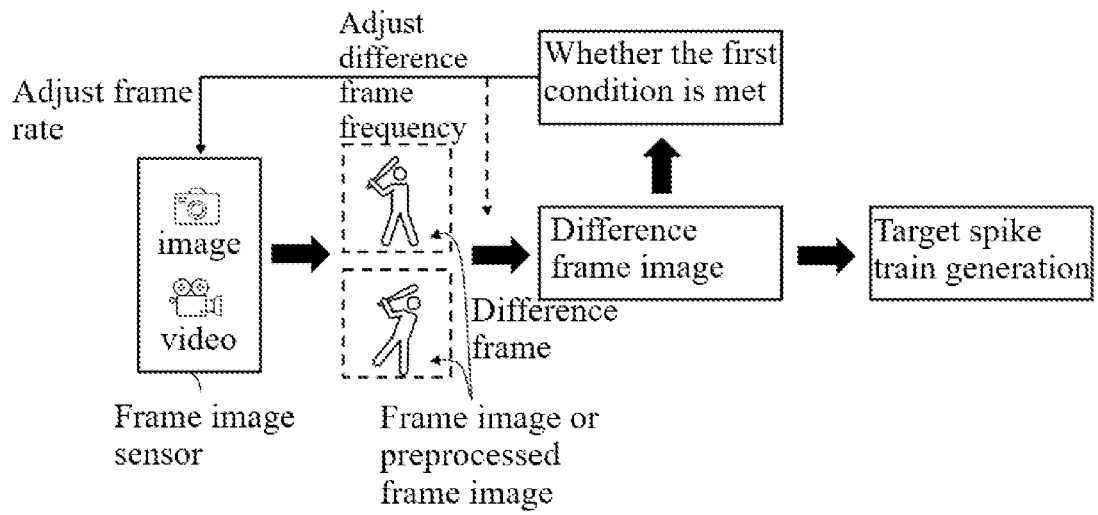

FIG. 3 is a schematic diagram of an adaptive spike generation method in an embodiment of the present invention.

Figure 4:
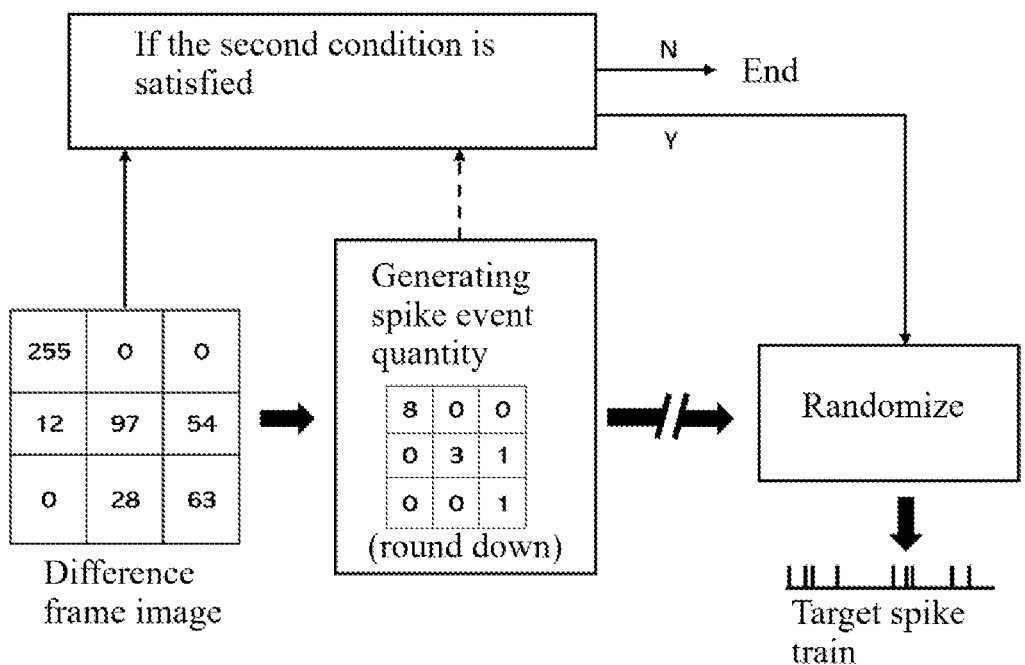

FIG. 4 is a flowchart of an adaptive spike generation method of the present invention.

Figure 5:
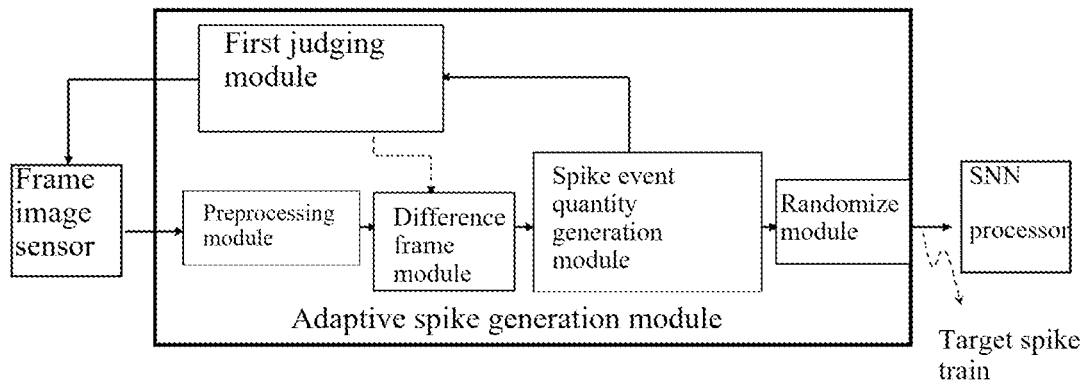

FIG. 5 is an adaptive spike generation device according to an embodiment of the present invention.

Figure 6:

FIG. 6 is a block diagram of an adaptive spike generation and processing system according to an embodiment of the present invention.

Figure 7:
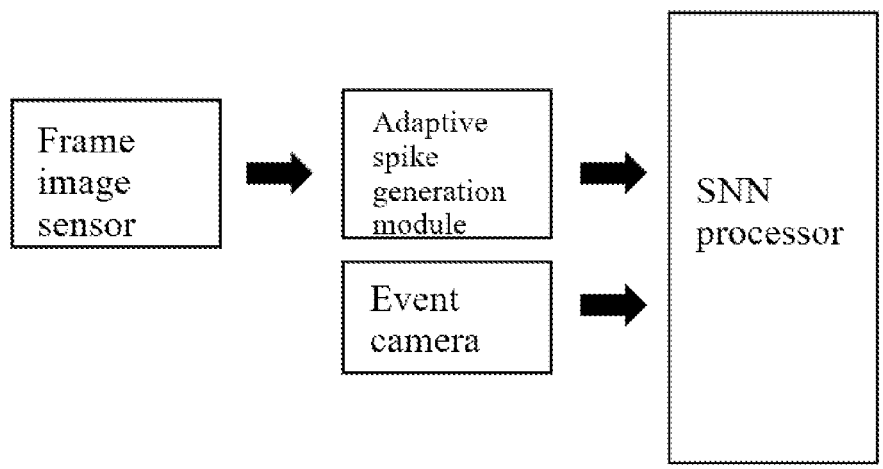

FIG. 7 is a block diagram of an adaptive spike generation and processing system according to an embodiment of the present invention.

Figure 8:
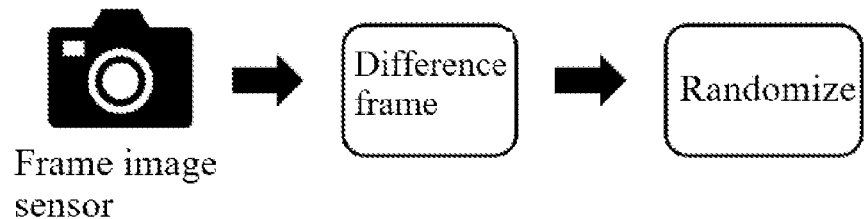

FIG. 8 is a block diagram of spike sequence randomization.

Figure 9:
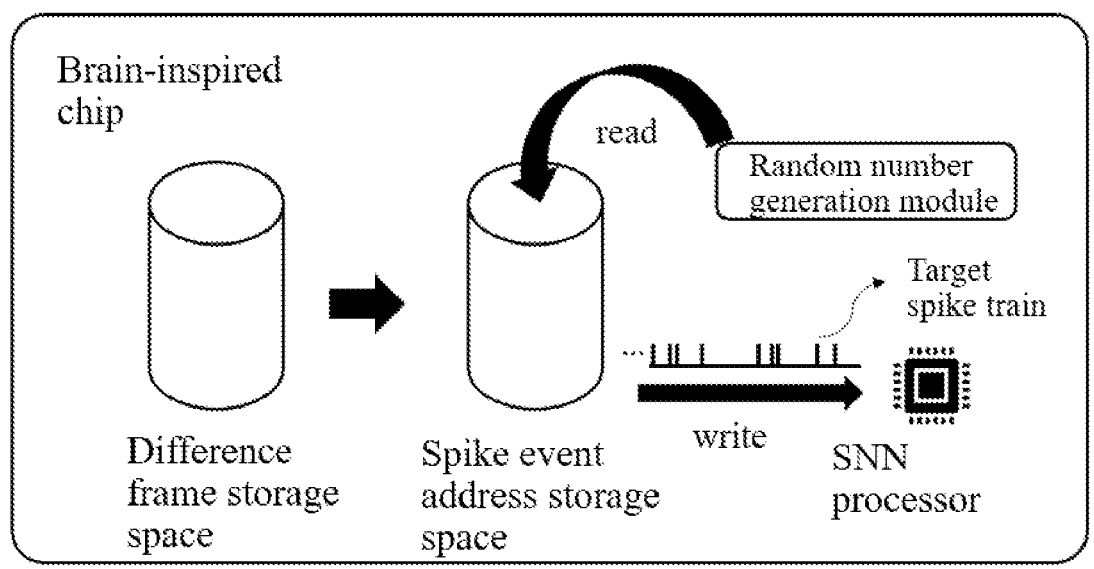

FIG. 9 is a schematic diagram of spike sequence randomization in an embodiment.

Figure 10:
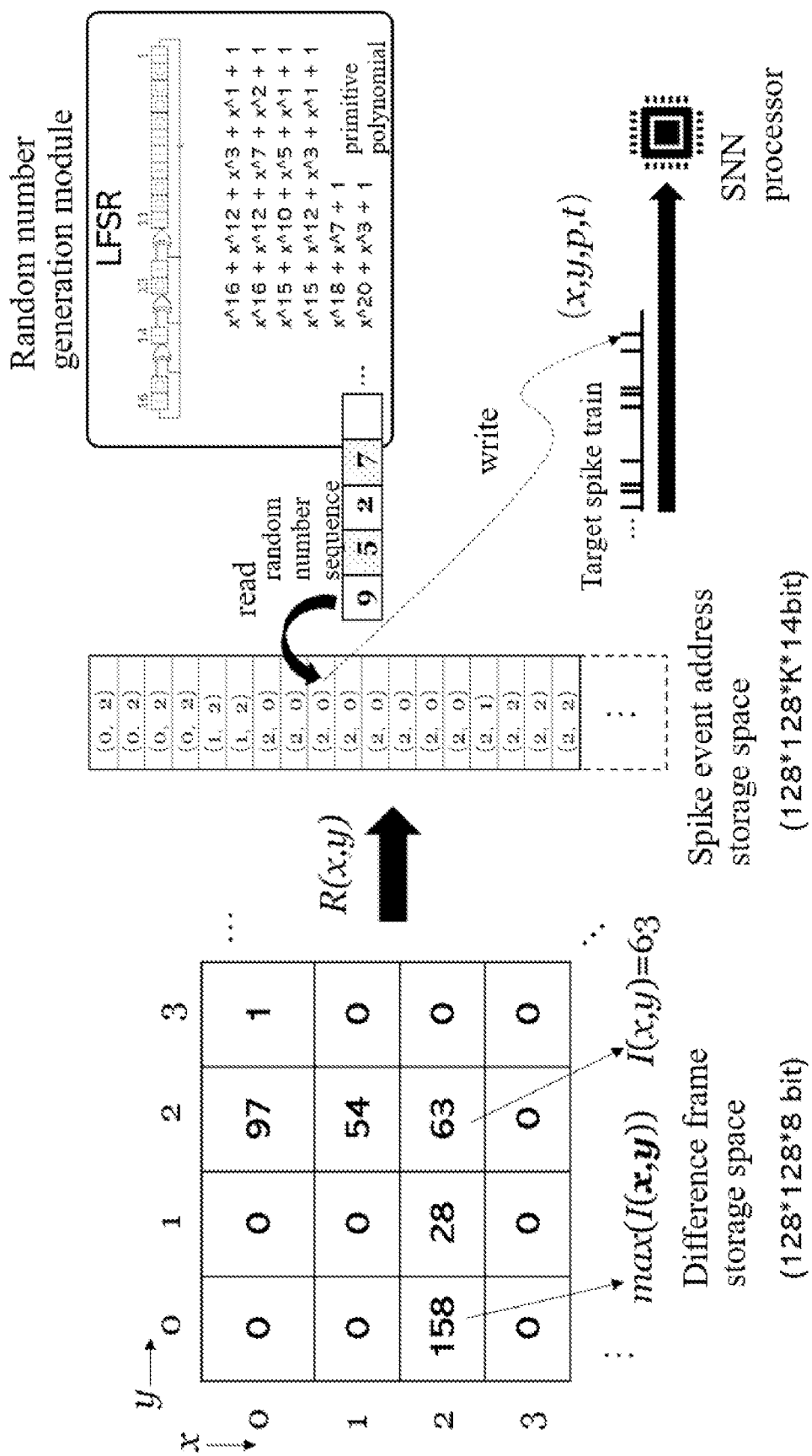

FIG. 10 is a detailed schematic diagram of spike sequence randomization in an embodiment.

Figure 11:
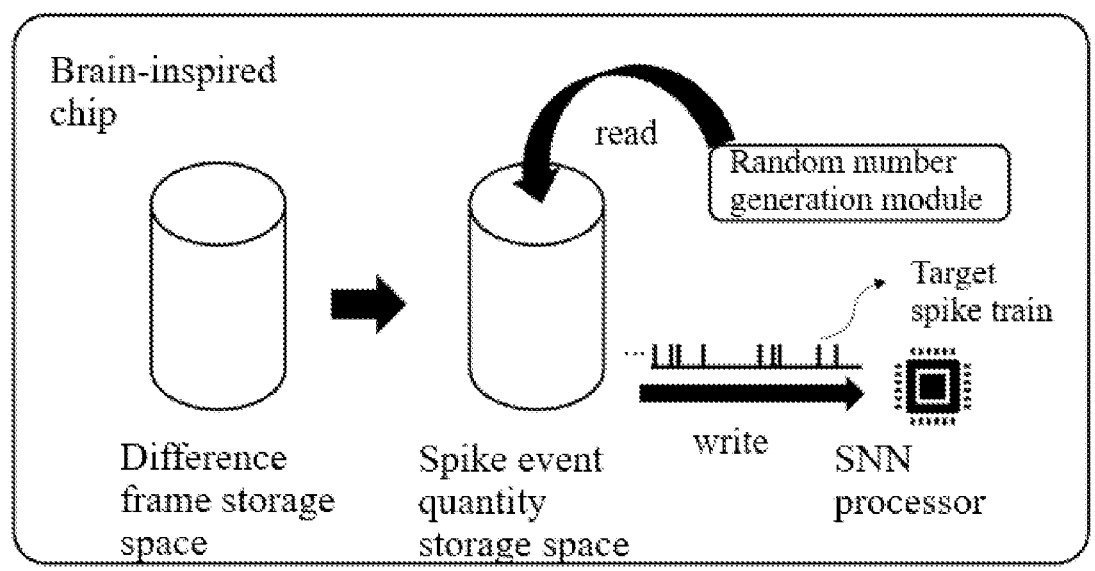

FIG. 11 is a schematic diagram of spike sequence randomization in an embodiment.

Figure 12:
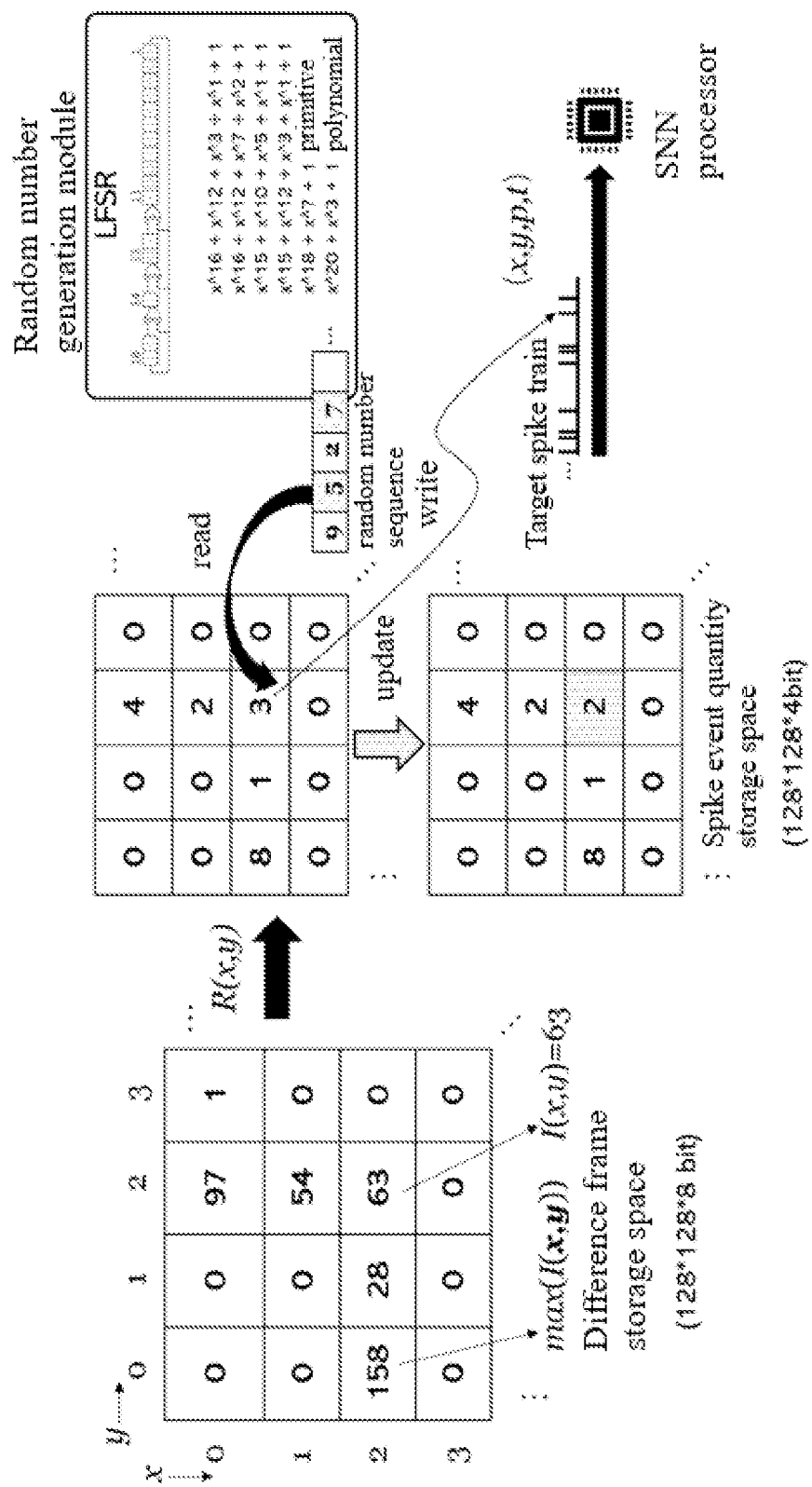

FIG. 12 is a detailed schematic diagram of spike sequence randomization in an embodiment.

Figure 13:
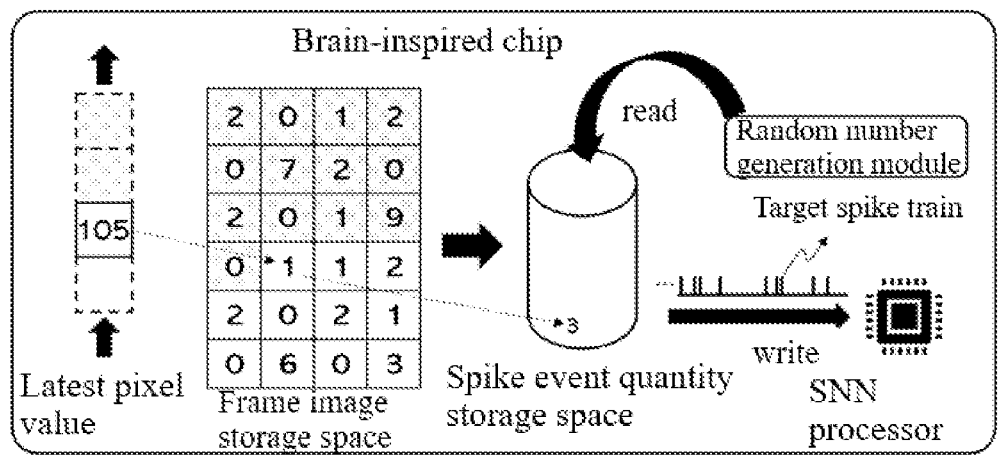

FIG. 13 is a schematic diagram of spike sequence randomization in an embodiment.

Figure 14:
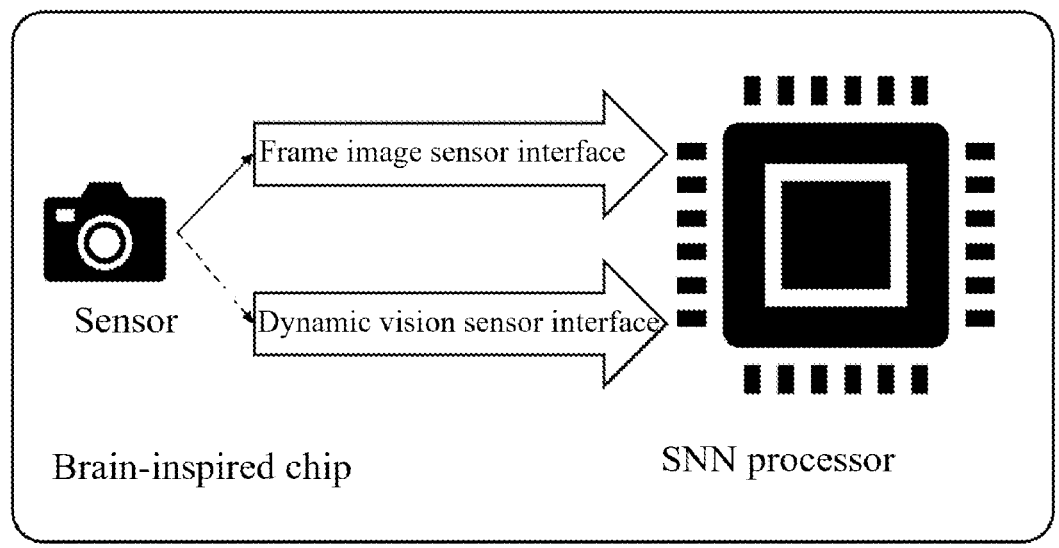

FIG. 14 is a schematic diagram of an on-chip sensor integration scheme.

Figure 15:
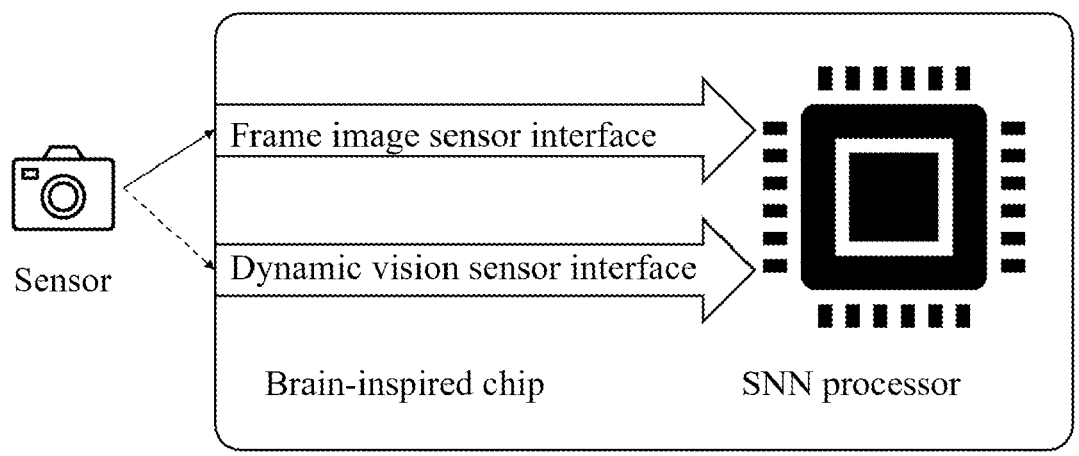

FIG. 15 is a schematic diagram of an off-chip sensor integration scheme.

Figure 16:
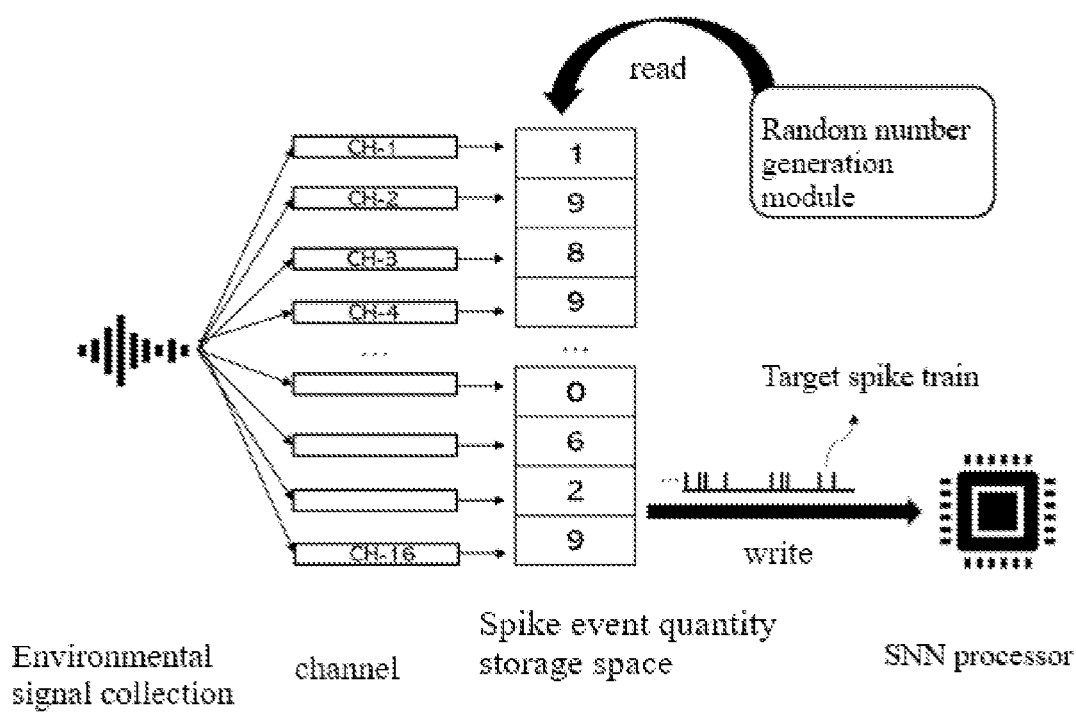

FIG. 16 is a detailed schematic diagram of spike sequence randomization in an embodiment.

Figure 17:
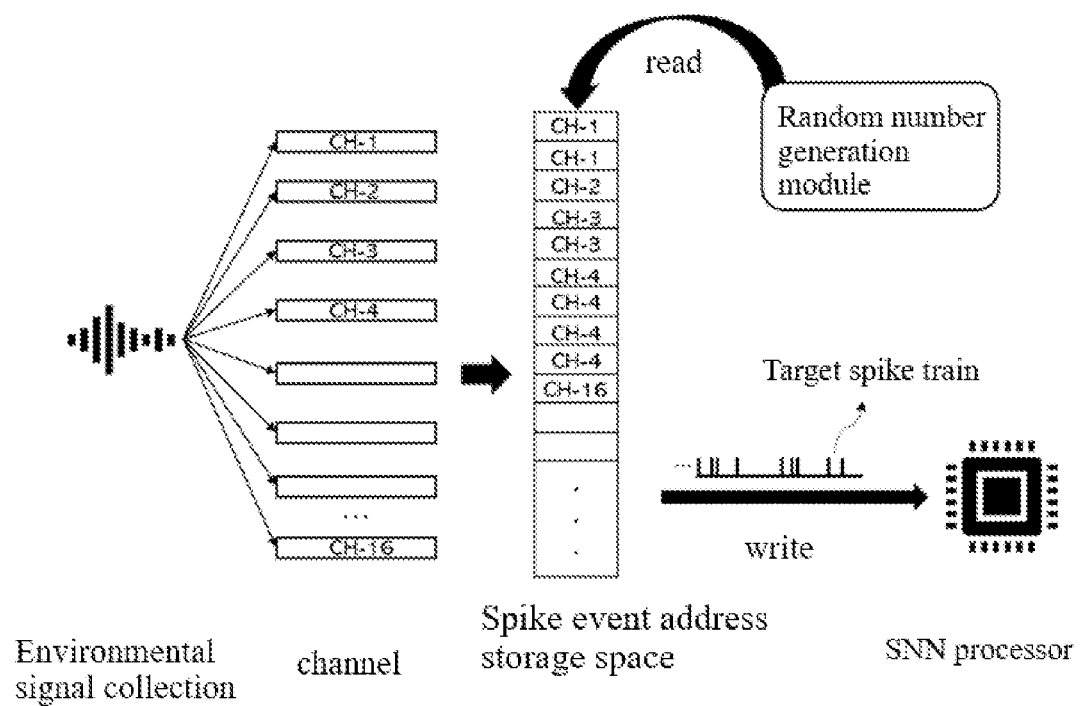

FIG. 17 is a detailed schematic diagram of spike sequence randomization in an embodiment.

DETAILED DESCRIPTION OF ILLUSTRATED EMBODIMENTS

Embodiments of Invention

Since various alternative solutions cannot be exhaustively described, the main points of the technical solutions in the embodiments of the present invention will be clearly and completely described below in conjunction with the drawings in the embodiments of the present invention. For other technical solutions and details not disclosed in detail below, they generally belong to the technical goals or technical features that can be achieved by conventional means in this field. Due to space limitations, the present invention does not introduce them in detail.

Unless it is the meaning of division, "I" at any position in the present invention means logical "or". The "first", "second" and other serial numbers in any position of the present invention are only used for distinguishing marks in the description, and do not imply an absolute order in time or space, nor do they imply that a term preceded by such a number necessarily refers differently to the same term preceded by other attributives.

The present invention will describe various key points for being combined into various specific embodiments, and these key points will be combined into various methods and products. In the present invention, even if only the key points described when introducing the method/product solution mean that the corresponding product/method solution also explicitly includes the technical feature.

When any position in the present invention describes that there is or includes a certain step, module, or feature, it does not imply that such existence is the exclusive existence. Those skilled in the art can obtain other embodiments according to the technical solutions disclosed in the present invention and supplemented with other technical means. Based on the points described in the specific embodiments of the present invention, those skilled in the art can completely replace, delete, add, combine, and change the order of certain technical features to obtain a technical solution that still follows the concept of the present invention. These solutions that do not deviate from the technical concept of the present invention are also within the protection scope of the present invention.

The frame image sensor of the present invention is a sensor capable of obtaining a frame image, such as a CMOS sensor, a CCD sensor, a grayscale sensor, etc. The present invention is not limited to a specific type of image sensor if a frame image can be obtained therefrom.

FIG. 1 is a flowchart of adaptive spike generation method in a preferred embodiment of the present invention, comprises the following steps:

Step S100: Perform frame image preprocessing.

The datasets of spiking neural networks are composed of spatiotemporal event streams, which are sparse. Conventional frame image sensors have higher resolutions and may generate a higher number of spike events after conversion. Therefore, the frame images generated by the sensor can be preprocessed in advance to reduce the number of events. This makes the generated target spike train sparsity.

Further, preprocessing operations may include size reshaping and grayscale, as illustrated in FIG. 2:

Step S101: Reshape any frame image.

Set a resolution of a frame image sensor to (W×H), and a resolution (or target size) of a frame image after reshaping is (W'×H'), wherein W and W' represent width, and H and H' represent height.

In an embodiment, the method of reshaping the size is down-sampling, and the method of reshaping the size of the frame image by down-sampling is simple to implement and friendly to hardware implementation. Specifically, the adjusted pixel coordinate of any pixel coordinate I(x,y) in the original frame image are $I'(x,y)=\lfloor x \times W/W', y \times H/H' \rfloor$, wherein x and y are the row and column coordinates of the pixel, respectively, and $\lfloor . \rfloor$ means rounding down. Alternatively, this rounding down may be replaced by rounding up.

In another embodiment, the method of reshaping the size is cropping. Based on the region of interest, the original frame image is cropped to obtain the target size. For example, crop any region of interest such as the upper left corner, lower right corner, or center of the original frame image. The cropping method of the present invention is not limited thereto.

In other embodiments, the method of reshaping the size may be any method such as bilinear interpolation, linear or non-linear scaling, and proportional value selection. The present invention does not limit the method of reshaping the size, and any means that can adjust the original frame image to the target size can be used.

Step S102: Grayscale the frame image.

Usually frame images are RGB images with three channels. The present invention converts an RGB image into a grayscale image. There may be multiple ways of grayscale, and the present invention does not limit the specific way of grayscale. For example, the value in any one of the three channels can be extracted as the gray value, or the maximum value, average value or weighted average value in RGB can be taken as the gray value, etc.

The present invention does not limit the order in which the size reshaping and grayscale operations are performed, and may be performed in parallel or in series, or only one of the operations may be performed. Further, the frame image preprocessing operation S100 of the present invention is not necessary and is only performed when necessary.

Step S200: Perform difference frame operation on the frame image to obtain pixel values of each pixel in the difference frame.

Specifically, at least two difference frame images or preprocessed frame images in the frame image sequence are compared to obtain a difference frame image of image changes between the two frames. The difference frame image reflects the change/motion information between frames.

In the process of the difference frame, the change value or the absolute value of the change value of the pixel value on each pixel point (pixel coordinate), or the value obtained after noise filtering and other operations, is called a difference frame pixel value. On a certain pixel point, the positive or negative of the difference frame pixel value can correspond to the polarity of the spike event. For example, a positive difference frame pixel value indicates pixel enhancement, corresponding to a positive event polarity. A negative difference frame pixel value indicates that the pixel is weakened, and the corresponding event polarity is negative, and vice versa, and the present invention is not limited thereto.

In some other embodiments, if the change of the pixel value at a certain pixel point does not satisfy a predetermined condition (for example, less than a certain threshold value), the difference frame pixel value can be discarded, that is, set to 0, which is beneficial to noise filtering.

For an image sequence containing N frames, the difference operation can be performed sequentially or in parallel. Parallel execution can greatly save power consumption and time and improve processing efficiency and real-time performance. Further, the difference between two adjacent frames may be performed sequentially or in parallel, and the difference between two frames separated by several frames may also be performed sequentially or in parallel. The present invention is not limited thereto.

In addition, the image sequence may be a set of original frame images collected by the sensor or a set of preprocessed frame images. Further, the order of step S100 and step S200 can be exchanged, and the difference frame can be performed after preprocessing the frame image, or the difference frame can be performed first and then the preprocessing operation can be performed.

Step S300: Generate the number of spike events corresponding to a pixel coordinate based on a difference frame pixel value of each pixel.

According to the difference frame pixel value of each pixel, the number of spike events corresponding to each pixel is obtained. Any reasonable conversion method from pixel value to number of spike events is possible. The present invention does not limit the method used to obtain the number of spike events corresponding to each pixel after the difference frame.

For example, the pixel value after the difference frame is m, resulting in the number of spike events rounded up or down. The number of spike events can be equal to the value $\lfloor |m| \rfloor$ after $|m|$ is rounded down, or the proportional value $k \times \lfloor |m| \rfloor$ after rounding down, wherein k represents the scaling factor. Using k can further reduce the number of spike events in the corresponding target spike train or increase the number of spike events in the corresponding target spike train. Further, the proportional coefficient k is a fixed value or a variable value. The present invention is not limited thereto. Alternatively, the above rounding down can be replaced by rounding up.

Step S400: Judge whether a first condition is satisfied at least based on an overall difference frame pixel value and/or the corresponding overall spike event number. If yes, adjust a frame image generation frame rate (frame rate for short) of a frame image sensor, or adjust a difference frame frequency in step S200. The specific adjustment method may be to increase or decrease the frame rate/difference frame frequency. If the condition is not met, the frame rate or the difference frame frequency is not adjusted, as illustrated in FIG. 3.

For a difference frame, it includes several pixels, and each of these pixels corresponds to a difference frame pixel value or the number of spike events. For a difference frame, its overall difference frame pixel value and/or the corresponding overall spike event number is a set formed by the difference frame pixel values or spike event numbers corresponding to these several pixels. To judge whether to adjust the frame rate or the difference frame frequency based on the whole set, it can be obtained by taking various transformations, statistics, calculations, etc. on the set to obtain a meaningful value (For example, to characterize the intensity of the movement of the object in front of the sensor), and based on this value, it is judged whether to trigger the above adjustment operation.

Further, for the embodiment including the preprocessing step S100, adjustments may be made through controlling the step S100 and/or S200 and/or S300.

Further, processing such as summation is performed on the number of spike events corresponding to each pixel coordinate or the difference frame pixel value, refer to step S200 or S300 for details, and the summation process can be executed sequentially or in parallel. In hardware, parallel execution is simple and has advantages in terms of power consumption and real-time performance.

The first condition includes one or more of the following situations:

In the difference frame, when a sum of pixel values, a sum of pixel values that satisfies a preset condition, or a count value of a number of pixels whose pixel value satisfies the preset condition: if it is less than a first threshold, the frame rate or the difference frame frequency is reduced, and/or greater than a second threshold, the frame rate or the difference frame frequency is increased; or in the difference frame, when a sum of the number of spike events corresponding to the difference frame, a sum of the number of spike events that satisfies the preset condition, or a count value of the number of pixels whose number of spike events satisfies the preset condition: if it is less than a first threshold, the frame rate or the difference frame frequency is reduced, and/or greater than the second threshold, the frame rate or the difference frame frequency is increased.

The sum of the pixel values of the difference frame/the sum of the number of spike events corresponding to the difference frame is to directly sum each pixel value or the number of spike events corresponding to each pixel in the difference frame. The sum of the pixel values of the difference frame whose pixel value satisfies the preset condition/the sum of the number of spike events that satisfies the preset condition is to set a condition (such as pixel value ≥10, number of spike events ≥2), and if the pixel values/number of spike events that satisfies the condition, they are accumulated and summed. The count value of the number of pixels in the difference frame whose pixel value satisfies the preset condition/the count value of the number of pixels in the difference frame whose pixel value satisfies the preset condition is to set a condition (such as pixel value ≥1 or 10, the number of spike events ≥1 or 2), if the pixels (coordinates) that satisfy the condition, they are accumulated and counted.

For the case of downward adjustment: For example, if the two frame images of the difference frame have not changed for a long time, or the change is not obvious, the sum of the pixel values of the difference frame of all pixels is small. The corresponding sum of spike generation numbers is small. Therefore, considering that there is no action or trigger to be recognized, the frame rate or difference frame frequency is reduced to reduce power consumption. For example, drop the frame rate from 30 to 1. The reduction of the frame rate or the difference frame frequency may be stepped, for example, from 60 to 30 and then to 1, and correspondingly, the first threshold includes multiple values.

For the case of upward adjustment: For example, the current frame rate is too low to satisfy the image acquisition of fast moving objects. However, after detecting that there is a target object moving, the frame rate is increased to reduce the motion blur of the image after the poor frame. For example, increase the frame rate from 1 to 30. Similarly, increasing the frame rate or difference frame frequency may also be stepwise, such as from 1 to 30 and then to 60, and correspondingly the second threshold includes multiple values.

The first threshold and the second threshold may be different or the same. In some embodiments, it may be beneficial to refer to the current frame rate or difference frame frequency status before deciding to adjust up or down.

In another embodiment, after reducing the frame rate or difference frame frequency for a first time interval, restore the frame rate or difference frame frequency to a default value. Following the previous example, the default values may be the above-mentioned 30/60 and 10. This embodiment allows for a certain percentage of time periods that can improve detection response sensitivity.

In another embodiment, the range of upward adjustment and downward adjustment can be proportionally adjusted according to the difference compared with the threshold. For example, both the first threshold and the second threshold refer to the threshold of the total number of spike events, and both are 1000. When the total number of spike events generated after the difference frame is 100, adjust the frame rate from 60 to 6. If the total number of spike events generated after the frame difference is 300, adjust the frame rate from 60 to 18, etc.

In addition, the first condition can also be extended to: That is, within the set time period, for different difference frames, if the sum of the difference frame pixel values/the sum of the difference frame pixel values whose pixel values satisfies the preset condition/the count value of the number of pixels in the difference frame whose pixel value satisfies the preset condition/the sum of the number of spike events corresponding to the difference frame/the sum of the number of spike events that satisfies the preset condition/the count value of the number of pixels in the difference frame whose number of spike events satisfies the preset condition is less than the first threshold, it is considered that the condition is satisfied, and the frame rate or frame frequency is reduced. This situation helps to reduce power consumption when no target object is moving, and further avoids slow response caused by immediately reducing the frame rate or poor frame frequency due to the user's temporary inactivity. Preferably, in the case of upward adjustment, no similar duration is set or even if the duration is set, the duration is extremely short. Because when an immediate response is required, setting this duration may artificially cause slow response.

In an equivalent alternative, in each of the above-mentioned embodiments, replace the judging of the count value of the number of pixels in the difference frame whose pixel value satisfies the preset condition/the count value of the number of pixels in the difference frame whose number of spike events satisfies the preset condition and the first threshold/second threshold with the proportion of the above count value in the number of pixels in the entire difference frame. The number of pixels in the difference frame is a constant, such that the difference is only whether the first threshold/second threshold is divided by the constant. Such equivalent replacement is also within the intended protection scope of the present invention.

Preferably, the first condition is used to reduce power consumption, especially when there is no moving object in the field of view of the frame image sensor for a long time, and it is also considered to increase the frame rate or difference frame frequency to satisfy the user's instantaneous response requirements. To this end, the above-mentioned technical means such as duration, number of spike events, pixel values of difference frames, proportions, and step thresholds can be combined. Such easily conceivable combinations and transformations do not deviate from the concept of the present invention and should be within the intended protection scope of the present invention.

Step S500: Perform randomization of spike events.

For spiking neural network (SNN) processor, its input data is a spatio-temporal event stream/spike train including the coordinates and timestamps of each event, such as AER (address event representation) event stream, SAER (serial AER) event stream, etc. The SNN processor is suitable for receiving random spike trains conforming to Poisson distribution, and any reasonable randomization method is feasible, for example, refer to prior arts 1 and 2, and the present invention is not limited thereto.

Due to the sparsity of the spatio-temporal stream, the present invention randomizes the spike event to make it conform to the information processing characteristics of the SNN processor. In an embodiment, the spike events corresponding to all pixels are randomized as a whole to obtain a target spike train. In another embodiment, the spike events corresponding to each pixel point are respectively randomized, and then the final target spike train is obtained. In addition, the randomization process of spike events on each pixel can be performed in parallel or serially, preferably a parallel scheme which has the advantage of low latency. In the following, the present invention also provides a specific spike train randomization scheme based on the overall consideration of the image.

Optionally, steps S400 and S500 of the present invention may be executed in parallel or sequentially.

As illustrated in FIG. 4, in a preferred embodiment, before the spike randomization step S500, a step S600 is also included: based on the difference frame pixel value corresponding to each pixel coordinate and/or the number of spike events, it is judged whether the second condition is satisfied, if yes, the current process is terminated. The termination method includes dropping frames (for example, resetting/clearing the current spike event set, etc.), or not performing the randomization step, and the present invention is not limited thereto.

The second condition is specifically: To judge whether a sum of pixel values of difference frames, a sum of difference frame pixel values whose pixel values satisfies a preset condition, or a count value of a number of pixels in the difference frame whose pixel value satisfies the preset condition is greater than a third threshold, and if yes, the step of obtaining the number of spike events corresponding to the pixel coordinate based on the difference frame pixel value is no longer performed; or to judge whether a sum of the number of spike events corresponding to the difference frame, a sum of the number of spike events that satisfies the preset condition, or a count value of the number of pixels in the difference frame whose number of spike events satisfies the preset condition: if it is greater than the third threshold, and if yes, a step of generating the randomized target spike train based on the number of spike events is no longer performed.

When the frame image sensor is violently shaken or teased, the sum of the number of spike events corresponding to the difference frame/the sum of the pixel values of the difference frame is too much in a short period of time. The resulting output spike train may not be valid input information for subsequent SNN processors and processing it may result in unnecessary output. In addition, due to the large number of spike events, the processor is prone to freeze or increase power consumption. Therefore, before the randomization step, frame images that change too quickly are filtered out in advance to reduce power consumption while ensuring processor performance.

FIG. 5 is an adaptive spike generation device according to an embodiment of the present invention. The present invention further discloses an adaptive spike generation device configured to generate a target spike train, comprising: a difference frame module configured to compare a difference between frame images to obtain a difference frame pixel value at each pixel coordinate in a difference frame; a spike event quantity generation module configured to generate a number of spike events corresponding to the pixel coordinate based on the difference frame pixel value; a randomization module configured to generating a randomized target spike train based on the number of spike events; and a first judging module configured to judge whether to adjust a frame generating rate or a difference frame frequency of the frame images at least based on an overall difference frame pixel value of all pixels in the difference frame and/or a corresponding overall number of the spike events of all pixels in the difference frame.

In some embodiments, the adaptive spike generation device further includes: a preprocessing module configured to preprocess frame images input to the difference frame module. Preprocessing operations may include size reshaping and/or grayscaling.

In some embodiments, the adaptive spike generation device further includes: a second judging module, based on the difference frame pixel value and/or the number of spike events corresponding to each pixel coordinate, to judge whether the second condition is satisfied, and if yes, terminate the current process.

For more adjustment strategies, refer to the above-mentioned method embodiments, which are incorporated into this embodiment by reference, and will not be repeated here.

FIG. 6 is a block diagram of an adaptive spike generation and processing system of the present invention, including a frame image sensor, an adaptive spike generation device, and a neural network processor coupled in sequence. The frame image sensor collects frame images. The adaptive spike generation device for low power consumption and fast generation of high-quality target spike trains. The neural network processor (such as SNN processor) is used for inference to output classification results.

The adaptive spike generation device can be set independently and can also be integrated in a processor or a frame image sensor. In some embodiments, the adaptive spike generation device is implemented as a frame image sensor interface. Furthermore, a frame image sensor, an adaptive spike generation device, and a neural network processor are integrated on the same chip. The chip has both perception and computing capabilities.

FIG. 7 is a block diagram of another adaptive spike generation and processing system of the present invention, including a frame image sensor, an adaptive spike generation device, an event sensor (such as an event camera) and a neural network processor. The adaptive spike generation device converts the frame image collected by the frame image sensor into the first target spike train. The event camera outputs a second target spike train. The neural network processor receives the first target spike train and/or the second target spike train for processing. Likewise, The frame image sensor or event camera can be provided independently or integrated with the processor on the same chip.

Referring to FIG. 8, which is a block diagram of spike train randomization in the present invention. The frame image sensor continuously outputs image information captured from the environment in the form of frames. For example, 30, 60, and 100 frames of images are output per second to a memory of the frame image sensor, such as a common RGB camera. The frame rate and the frame image sensor can be flexibly selected according to actual application requirements, and the present invention is not limited to a specific form.

Due to the sequential nature of frame images, the difference between one or more adjacent frame images is obtained to obtain the difference image information between the two frame images, that is, difference of frames (DoF). The difference frame can be the absolute value of the depixelated difference, or it can preserve the significant sign (polarity) information. For example, when waving the palm in front of the sensor, a certain frame of image display is a complete palm image including texture. The difference frame shows the outline information of the palm instead of the texture, which is similar to the result of DVS capturing the outline of moving objects.

Before executing the difference frame, steps such as image down-sampling operation, grayscale information extraction, and region of interest extraction may also be included, and then the spike train randomization step is performed. For more means of difference frame, refer to prior art 3. The image down-sampling operation is conducive to directly using the existing camera in the electronic device without having to install a new set of imaging modules and sensors, thereby reducing costs.

Referring to FIG. 9, which shows a schematic diagram of spike train randomization in the first embodiment. The difference frame storage space is used to store the pixel values of the difference frame. The storage unit included in the spike event address storage space is used to store the pixel coordinates corresponding to the pixel values of the difference frames. The number of times to store the spike event address (that is, the pixel coordinates corresponding to the difference frame pixel value) in the spike event address storage space is judged based on the difference frame pixel value. The random number generation module generates a random number sequence, reads the spike event address in the spike event address storage space according to the random number sequence, that is, judges the address (x, y) of the spike event to be issued at the current time/time stamp t, or then combined with the polarity information p, a spike event containing (x, y, p, t) information is obtained.

The address of the spike event is continuously read according to the random number sequence and a target spike train composed of spike events is generated, so far, the randomization process of the spike sequence is completed. This spike train is sent to a subsequent system and processed. Preferably, the subsequent system here is an SNN processor, and of course it can also be other signal processing devices.

For the SNN processor, the difference frame or even the normal frame image is converted into a random target spike train. If it is converted pixel by pixel into short random spike trains, then these short random spike trains are sequentially stitched. After being sent to the SNN processor for inference, the obtained network performance may be extremely low, because it does not conform to the information processing characteristics of the spiking neural network. Prior art 1 does not provide a method for how to randomize an image as a whole, but only how to generate a randomized target spike train for a single pixel. Therefore, the present invention may disclose how the entire image (specifically, the difference frame) is randomly randomized into a target spike train.

Referring to FIG. 10, which shows a detailed schematic diagram of spike train randomization in the first embodiment. For example, if the size of the image used for the difference frame is 128×128 (the product of the horizontal and vertical resolutions, recorded as the number of pixels in the difference frame), and the width of each pixel value is 8 bits, then the size of the difference frame storage space is at least 128×128×8 bits. Since the pixel difference values between frame images separated by several frames (preferably two adjacent frames) are calculated, most of the pixel values of the difference frames are 0, and generally only the pixel values at the contours of moving objects are non-zero. Without loss of generality, the value of a certain pixel in the difference frame is I(x,y), and the maximum pixel value in the difference frame is max(I(x,y)), wherein the thin body (x, y) indicates the position of a certain pixel in the frame image sensor, and the bold body (x, y) indicates the set of coordinates of all pixels in the frame image sensor.

After the difference frame of the frame image sensor is obtained, at least based on the value of each pixel in the difference frame, the spike event address corresponding to the pixel (that is, the pixel coordinate of the pixel) is generated. As illustrated in FIG. 10, the pixel value I(0,2)=97 with coordinate (x,y)=(0,2), I(2,2)=63, and the maximum pixel value in the difference frame is max(I(x,y))=158.

In order to encode these pixel values in the difference frame storage space, it is necessary to obtain the corresponding number of spike events according to these pixel values. And record the number of spike events corresponding to the pixel with coordinates (x, y) in the difference frame as R(x, y).

To obtain the number of spike events R(x,y), different approaches can be taken. In certain embodiments, $R(x,y)=\lfloor I(x,y)\times N/M \rfloor$, wherein: $\lfloor . \rfloor$ is the rounding down operation; N is the maximum number of spike events allowed to be issued by a single pixel, such as 8 or 16; M is the theoretical maximum value of pixels in the difference frame, for example, the maximum value of pixels with a width of 8 bits is 255.

In an embodiment, $R(x,y)=\lfloor I(x,y)\times N/\max(I(x,y)) \rfloor$. In other words, the maximum pixel value in the current difference frame is considered when quantizing the pixel value, that is, the image contour is enhanced adaptively. Compared with the previous embodiment, the advantage of this embodiment is that in a dark scene or a small object movement, the outline of the object obtained by the difference frame is not obvious, but this embodiment enhances the outline. For example, I(2, 2)=63 in FIG. when N=8, if take the previous embodiment, its corresponding R(x, y)=1, and in the latter embodiment R(x, y)=3.

In one embodiment, $R(x,y)=\lfloor I(x,y)\times N/P \rfloor$, wherein P=max(max(I(x,y)),Q), wherein Q is the first lower limit value, such as 30. In this embodiment, compared with the previous embodiment, not only the contour adaptive enhancement is considered, but also the adverse effect of the adaptive enhancement on the spike sparsity when the sensor only has background noise. In view of the fact that the sensor works in an environment with only background noise for a long time, this embodiment suppresses the issue of unnecessary power consumption of the SNN processor caused by the excessive emission of spike events caused by contour enhancement. Under the premise that the first lower limit value Q=30 and the number of pixels corresponding to the maximum pixel value and the pixel value below it in the difference frame is uniformly distributed, when max(I(x,y))=10 and 20, the corresponding number of spike events in the target spike train may be reduced by 75% and 40%, respectively.

In some alternative embodiments, the above-mentioned rounding down is replaced by rounding up.

In an alternative embodiment, when the pixel value in the difference frame is smaller than the second lower limit value, the pixel value in the difference frame is directly set to zero. Preferably, this step is performed during the calculation of the difference. For example, the pixel value corresponding to the pixel whose coordinate is (0, 3) in FIG. 10 is 1, and when it is less than the second lower limit value 5, the pixel value is set to zero, such that background noise can be filtered.

In an embodiment, the polarity information is preserved during the process of obtaining the difference frame, such that the calculation of R(x, y) should also consider taking the absolute value to satisfy the objective needs of reality.

For most cases in the difference frame, that is, pixels with a pixel value of 0, the number of corresponding spike events is generally 0, which ensures the sparsity of the target spike train.

After obtaining the spike event number R(x, y) corresponding to the pixel value in the difference frame, store R(x, y) spike event addresses (x, y) in the spike event address storage space. The bit width of the storage space can be judged according to the length of the spike event address. For example, if the image size of the difference frame is 128×128, the bit width of the storage space is 14 bits. The addresses corresponding to the pixels in the difference frame can be stored in the spike event address storage space in any reasonable manner. For example, the row/column is stored in sequence/reverse order, and the same address can be stored in sequence/disorder/displacement, and the present invention is not limited to a specific form.

Since the maximum number of spike events allowed by a single pixel is N (for example, 8), the theoretical maximum length of the spike event address storage space, taking the difference frame resolution of 128×128 as an example, should be 128×128×N. However, since the difference frame only expresses the outline of the object, the data of the difference frame is sparse. Unless it is an instantaneous switch between pure black and pure white environments, the maximum length may not be exhausted when actually storing addresses. Here it can be assumed that the actual length of the storage space is the number of pixels in the difference frame×K (K<N), for example, K=3. Therefore, the spike event address storage space occupies difference frame pixel number×K×storage space bit width, which is 128×128×K×14 bits following the previous example.

The random number generation module generates random integers with a numerical value ranging from 1 to the number of pixels of the difference frame×N (essentially a pseudo-random number), or a random number within another numerical range that can correspond to integers within this numerical range one-to-one. Numbers, such as 0 to the number of pixels in the difference frame×N−1 or others, constitute a random number sequence. In addition, after these values are generated in one cycle, these values are cyclically generated in the next cycle. The purpose of generating these random numbers is that part of these random numbers can be mapped one by one to the serial number of each storage unit in the spike event address storage space. That is, each time a random number is generated, an address stored in a storage unit corresponding to the serial number in the spike event address storage space can be read once according to the mapping relationship between the random number and the serial number in the spike event address storage space. For example, the random number sequence is 9-5-2-7 . . . , then the address with the sequence number 9-5-2-7 . . . in the spike event address storage space is read in sequence.

Preferably, generating the above random number sequence is realized through a linear feedback shift register (LFSR) and an XOR gate. The generation of pseudo-random numbers is achieved, for example, by circuits configured to express primitive polynomials. This technology is well known in the art and will not be repeated here.

Note that the range of the pseudo-random number is 1 to the number of pixels in the difference frame×N, and the number Kr of the storage unit (the storage unit filled with coordinates in FIG. 10) that stores the effective address converted from the pixel value in the difference frame (<K, dynamically changing with different frames) may not be more than the actual length of the spike event address storage space (the number of pixels in the difference frame× K), where K<N. Therefore, if the random number is mapped outside 1 to Kr, the corresponding time/time step does not issue a spike event (also called non-spike). Thus, the target spike train is usually a sparsely interleaved spike train.

There may be more than one random number generation module. As mentioned above, the first random number generation module generates pseudo-random numbers within a setting range, and the second random number generation module also generates pseudo-random numbers within a setting range. The two have the same setting range, and when used, the two generate target spike trains for different difference frames in a certain order (the simplest is alternating). For three or more random number generation modules, it can be handled in a similar manner.

For example, a simple mapping scheme is one-to-one correspondence between 1 to Kr in the random number (1 to the number of pixels of the difference frame×N) and the serial numbers 1 to Kr of the storage units in the spike event address storage space based on equivalence. Any reasonable and feasible value range of the random number and its mapping relationship with the storage unit can be applied in the present invention, which is not limited to a specific method.

Preferably, the target spike train is sent to the SNN processor for processing, such that the present invention endows the SNN processor with the ability to process the environmental signal captured by the frame image sensor.

Referring to FIG. 11, which illustrates a schematic diagram of spike train randomization in another embodiment of the present invention. The difference from the scheme shown in FIG. 9 is that the number of times to store the spike event address is not judged based on the pixel values in the difference frame storage space, but the corresponding number of spike events R(x, y) is generated.

Referring to FIG. 12, which illustrates a detailed schematic diagram of spike train randomization in another embodiment. In this embodiment, to simplify the description, the technical features and various technical symbols described in the previous embodiment are cited here.

After pixel values of the difference frame are obtained and stored in the difference frame storage space, the corresponding spike event number R(x, y) is generated and stored in a storage unit corresponding to the spike event number storage space. The number of storage units in the storage space for the number of spike events is the same as the number of pixels of the difference frame, which is 128×128 following the previous example.

Similarly, a random number sequence is generated by the random number generation module, and the corresponding storage unit is read according to the current random number. If R(x, y)>1 stored in the storage unit, a corresponding spike event is issued, such as a spike event containing at least (x, y, t) information, and t is a time stamp.

In addition, this embodiment may also update the corresponding R(x, y) value, for example, decrement by 1. As illustrated in FIG. 12, the number of spike events of the pixels of the difference frame at the address (x,y)=(2,2) is updated from 3 to 2.

In this embodiment, the period of the random number sequence is equal to the number of pixels in the difference frame. In a pseudo-random sequence period, all pixels with non-zero R(x,y) may issue a spike event. For a difference frame, the pseudo-random sequence loops N times (allowing the maximum number of spike events issued by a single pixel), until all the spike events are issued. Although this scheme destroys the randomness of spike distribution to a certain extent, the actual test shows that the performance of SNN does not have obvious disadvantages. Compared with the previous embodiment, this embodiment occupies less storage space.

FIG. 13 illustrates a schematic diagram of spike train randomization in yet another embodiment. The difference from the previous embodiment is that the latest pixel value obtained from the frame image sensor is directly subtracted from the pixel value of the corresponding coordinates stored in the frame image storage space. The pixel value of the corresponding coordinate in the difference frame is obtained, and the corresponding number of spike events R(x,y) is calculated according to the pixel value. Further, the number of spike events is stored in a corresponding storage unit in the storage space of the number of spike events. In other words, there is no difference frame storage space dedicated to storing pixel values of the difference frame in this yet another embodiment. Therefore, max(I(x,y)) cannot be obtained when calculating the number of spike events R(x,y) mentioned above, and it is only suitable for non-contour enhancement type embodiments.

In addition, the latest pixel value is stored in a corresponding storage unit in the frame image storage space. For example, in FIG. 13, the pixel value of the pixel whose coordinate is (x, y) is obtained from the sensor is 105. The pixel value of the corresponding coordinate previously stored in the frame image storage space is 1, and R(x,y)=3 is calculated after doing the difference. That is, the spike event number 3 is stored in the corresponding storage unit in the spike event number storage space, and the pixel value of the corresponding coordinate stored in the frame image storage space is updated to 105. Other technical means are the same as those of the previous embodiments, which are described here by reference and will not be repeated here.

In addition, the present invention further discloses a spike train randomization device comprising: a difference frame storage space and a spike event address storage space or a spike event quantity storage space; or a frame image storage space and a spike event quantity storage space; and the spike train randomization device configured to perform the above spike train randomization methods (refer to FIG. 8 to FIG. 13 and corresponding descriptions); wherein the difference frame storage space is used to store a difference frame pixel value; a storage unit included in the spike event address storage space is used to store a pixel coordinate corresponding to the difference frame pixel value; the storage unit included in the spike event quantity storage space is used to store a number of spike events corresponding to the difference frame pixel value; a storage unit included in the frame image storage space is used to store a latest pixel value obtained from a frame image sensor.

In an embodiment, the spike train randomization device is implemented as a frame image sensor interface.

FIG. 14 illustrates a schematic diagram of an on-chip sensor integration scheme. Sensors include DVS and/or frame image sensors. Through the dynamic vision sensor interface and/or the frame image sensor interface, the spike event train generated by the DVS and/or the generated randomized target spike train are sent to the SNN processor for processing. The DVS and/or frame image sensor and SNN processor are located on different dies and are integrated on the same chip. This chip can be called a brain-inspired chip or neuromorphic chip, and it is a brain-inspired chip integrating sensing and computing.

FIG. 15 illustrates a schematic diagram of an off-chip sensor integration scheme. Sensors include DVS and/or frame image sensors. Through the dynamic vision sensor interface and/or the frame image sensor interface, the spike event train generated by the DVS and/or the generated randomized target spike train are sent to the SNN processor for processing. The DVS and/or the frame image sensor and the SNN processor establish a communication connection through a cable, such as based on a USB protocol.

In an embodiment, the chip supports binocular sensors. Preferably, one is a DVS, and the other is a frame image sensor. Preferably, one is an on-chip integrated sensor, and the other is an off-chip sensor. These on-chip/off-chip and sensor types can be flexibly and freely combined into different embodiments.

Referring to FIG. 16, which shows a detailed schematic diagram of spike train randomization in yet another embodiment. In this embodiment, it is no longer limited to the above-mentioned collection of vision signals, but is aimed at environmental signals, such as sound, vibration, electrocardiographic signal, etc., and the present invention is not limited thereto.

The collected environmental signals are set or processed by various software/hardware. For example, the sound signal can be filtered by multiple band-pass filters of different frequency bands to obtain multiple channel output signals. These channel identifiers also called channel addresses, such as CH-1, CH-16, etc., are equivalent to the above-mentioned pixel coordinates/spike event addresses.

Then the number of spike events corresponding to each channel is obtained and stored in corresponding storage units in the storage space of the number of spike events. The number of spike events corresponding to each channel is obtained here by mapping the channel output signal to the corresponding number of spike events. It can be any reasonable form of means, such as an incremental value based on the channel output signal, various spike thinning means, etc., and the present invention is not limited to a certain specific means.

Referring to the foregoing embodiments, the random number generated by the random number generating module is used to read the storage unit corresponding to the random number. If a non-zero value is found, a spike event is generated based at least on the channel address corresponding to the memory cell. Further, the number of spike events stored in the storage unit is updated, for example, 1 is subtracted. Several such spike events constitute the target spike train. The target spike train is set to the SNN processor. It is understood that, for a value of 0 in a memory cell, there is no need to generate and issue a spike event. For other technical features, the technical features of the foregoing embodiments are cited here by way of reference and will not be repeated here.

Referring to FIG. 17, which illustrates a detailed schematic diagram of spike train randomization in the second embodiment. The difference from the embodiment shown in FIG. 16 is that after obtaining the number of spike events corresponding to each channel, the channel address is written in the same number of storage units located in the spike event address storage space. As shown in FIG. 17, the number of spike events of CH-1 is 2, such that the address is written twice, and CH-2 is written once because the corresponding number of spike events is 1. Then a random number is obtained from the random number generator module. An address in the storage unit corresponding to the random number is read in the spike event address storage space. A spike event is generated and dispatched based at least on the read channel address. However, if the mapping result of the random number exceeds the storage space of the spike event address, or even exceeds the range of the storage unit with a valid channel address, then there is no need to generate and issue a spike event. Several such spike events constitute the target spike train, and the target spike train is sent to the SNN processor. For other technical features, the technical features of the foregoing embodiments are cited here by way of reference and will not be repeated here.

The present invention discloses a chip. The chip is a brain-inspired chip or a neuromorphic chip. The chip includes a frame image sensor interface as described above, or both a frame image sensor interface and an event sensor interface. The chip uses any one of the above adaptive spike generation methods, or includes any one of the above the adaptive spike generation devices.

The present invention further discloses an electronic device, such as a smart home appliance, a smart phone, etc., which includes the above-mentioned brain-inspired chip or spike train randomization device for real-time monitoring and intelligent response to environmental signals. Ultra-low power consumption, such as brain-inspired chips, can achieve always-on intelligent inference. By configuring one or more specific inference capabilities on the SNN processor, the electronic device end can be endowed with intelligent information processing capabilities.

In addition, the present invention further discloses an electronic device including the above-mentioned chip, which is used to respond to environmental signals with low power consumption, real-time, and high performance. The solution of the present invention having extremely low power consumption is suitable for edge intelligent computing and is suitable for fields such as smart home, Internet of Things, automatic driving, and smart toys.

Although the present invention has been described with reference to specific features and embodiments thereof, various modifications, combinations, and substitutions can be made thereto without departing from the present invention. It is intended that the scope of the present invention is not limited to the particular embodiments of the process, machine, manufacture, composition of matter, means, methods and steps described in the specification, and these methods and modules may also be implemented in one or more products and methods that are associated, interdependent, interoperable, and preceding/subsequent.

Accordingly, the specification and drawings should be considered simply as a presentation of some embodiments of the technical solution defined by the appended claims. The appended claims should therefore be interpreted in accordance with the most reasonable interpretation and are intended to cover as much as possible all modifications, changes, combinations, or equivalents within the disclosed scope of the present invention. Further, unreasonable interpretations should be avoided.

In order to achieve better technical effects or satisfy the requirements of certain applications, those skilled in the art may make further improvements to the technical solution on the basis of the present invention. However, even if this partial improvement/design is creative and/or progressive, if the technical concept of the present invention covers the technical features defined in the claims, the technical solution should also fall within the protection scope of the present invention.

Several technical features mentioned in the appended claims may have alternative technical features, or the order of certain technical processes and the order of material organization may be reorganized. After knowing the present invention, those of ordinary skill in the art can easily think of these replacement means or change the sequence of the technical process and the sequence of material organization, and then use basically the same means to solve basically the same technical problems and achieve basically the same technical effects. Therefore, even if the above-mentioned means and/or sequence are clearly defined in the claims, all such modifications, changes, and replacements shall fall within the protection scope of the claims based on the principle of equivalents.

The method steps or modules described in the embodiments disclosed herein can be implemented by hardware, software, or a combination of the two. In order to clearly illustrate the interchangeability of hardware and software, the steps and components of each embodiment have been generally described in terms of functions in the above description. Whether these functions are performed by hardware or software depends on the specific application or design constraints of the technical solution. Those skilled in the art may use different methods to implement the described functions for each specific application, but such implementation should not be regarded as outside the scope of the present invention.

What is claimed is:

1. A spike train randomization method, comprising:
    obtaining a pixel value of a difference frame between frame images;
    calculating a number of spike events corresponding to the difference frame pixel value according to the difference frame pixel value;
    wherein the spike train randomization method further comprises at least one of the following steps:
    i) storing a pixel coordinate corresponding to the difference frame pixel value in the same number of storage units as the number of spike events; reading the pixel coordinate stored in the storage unit corresponding to a random number according to a currently obtained random number; generating spike events in a target spike train at least according to a read pixel coordinate information;
    ii) storing the number of spike events in the storage unit corresponding to the pixel coordinate of the difference frame pixel value; reading the number of spike events stored in the storage unit corresponding to the random number according to the currently obtained random number; if a read number of spike events is non-zero, generating spike events in the target spike train at least according to a pixel coordinate information of the difference frame pixel value corresponding to the storage unit.

2. The spike train randomization method of claim 1, wherein:
    the difference frame pixel value is a difference between pixel values between two adjacent frames of images, or an absolute value of the difference between the pixel values between two adjacent frames of images.

3. The spike train randomization method of claim 1, wherein:
    calculating the number of spike events corresponding to the difference frame pixel value is obtained according to one of the following methods:
    i) a ratio of a product of the difference frame pixel value and a maximum number of spike events allowed to be issued by a single pixel to a theoretical maximum value of the pixel in the difference frame;
    ii) a ratio of the product of the difference frame pixel value and the maximum number of spike events allowed to be issued by a single pixel to a maximum pixel value in the difference frame;
    iii) a ratio of the product of the difference frame pixel value and the maximum number of spike events allowed to be issued by a single pixel to a larger one of the maximum pixel value in the difference frame or a first lower limit value.

4. The spike train randomization method of claim 1, wherein:

after obtaining the difference frame pixel value between the frame images, if the difference frame pixel value is smaller than a second lower limit value, the difference frame pixel value is set to zero.

5. The spike train randomization method of claim 1, wherein:

a random number sequence is generated by a random number generation module, and a currently obtained random number comes from the random number sequence;

the random number sequence does not generate the same random number within a cycles.

6. The spike train randomization method of claim 5, wherein:

the random number generation module comprises at least one random number generator based on a linear feedback shift register; or a period of the random number sequence is equal to a product of a number of pixels in the difference frame and a maximum number of spike events allowed to be issued by a single pixel, or equal to the number of pixels in the difference frame.

7. The spike train randomization method of claim 1, wherein:

according to the currently obtained random number, when reading the number of spike events stored in the storage unit corresponding to the random number, the random number comes from a random number sequence, and a period of the random number sequence is equal to the number of pixels in the difference frame;

for each difference frame, the random number sequence is executed for a number of cycles equal to a maximum number of spike events allowed to be issued by a single pixel.

8. The spike train randomization method of claim 1, wherein:

after acquiring difference frame pixel values between the frame images, storing the difference frame pixel values in a difference frame storage space; or, after acquiring the difference frame pixel values between the frame images, the number of spike events corresponding to the difference frame pixel value frames is directly calculated without storing the difference frame pixel values.

9. The spike train randomization method of claim 1, wherein:

a number of storage units storing the pixel coordinates corresponding to the pixel values of the difference frame is less than a product of the number of pixels in the difference frame and a maximum number of spike events allowed to be issued by a single pixel.

10. The spike train randomization method of claim 1, wherein:

a number of storage units storing the pixel coordinates corresponding to the pixel values of the difference frame is less than a product of the number of pixels in the difference frame and a maximum number of spike events allowed to be issued by a single pixel.

11. The spike train randomization method of claim 1, wherein:

if the number of spike events read is not zero, the number of spike events stored in the storage unit corresponding to the random number is reduced by one.

* * * * *